United States Patent
Barajas Gonzalez et al.

(10) Patent No.: US 10,228,441 B2
(45) Date of Patent: Mar. 12, 2019

(54) ACCURATE TRACKING INFORMATION SYSTEM

(71) Applicant: INTERNATIONAL BUSINESS MACHINES CORPORATION, Armonk, NY (US)

(72) Inventors: Emmanuel Barajas Gonzalez, Guadalajara (MX); Shaun E. Harrington, Sahuarita, AZ (US); Harry McGregor, Tucson, AZ (US); Christopher B. Moore, Vail, AZ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 489 days.

(21) Appl. No.: 14/829,025

(22) Filed: Aug. 18, 2015

(65) Prior Publication Data
US 2017/0052246 A1 Feb. 23, 2017

(51) Int. Cl.
*G01S 3/02* (2006.01)
*G01S 5/02* (2010.01)
*G01S 5/04* (2006.01)

(52) U.S. Cl.
CPC ............ *G01S 5/0294* (2013.01); *G01S 5/021* (2013.01); *G01S 5/04* (2013.01)

(58) Field of Classification Search
CPC ........... G01S 5/021; G01S 5/0294; G01S 5/04
USPC .................................................. 342/450, 451
See application file for complete search history.

(56) References Cited

U.S. PATENT DOCUMENTS

| | | | |
|---|---|---|---|
| 5,610,815 A * | 3/1997 | Gudat | G01S 19/11 318/587 |
| 6,249,252 B1 * | 6/2001 | Dupray | G01S 1/028 342/357.29 |
| 7,525,484 B2 * | 4/2009 | Dupray | G01S 1/026 342/450 |
| 7,738,884 B2 * | 6/2010 | Cheung | G01S 5/0226 455/456.3 |
| 7,924,149 B2 | 4/2011 | Mendelson | |
| 8,031,050 B2 * | 10/2011 | Johnson | G06F 17/30867 340/539.13 |
| 8,233,912 B2 * | 7/2012 | Taaghol | H04W 64/00 342/386 |
| 8,504,077 B2 * | 8/2013 | Hodges | G01S 5/02 342/357.28 |
| 8,509,121 B2 * | 8/2013 | Dailey | H04W 76/40 370/261 |
| 8,712,690 B1 | 4/2014 | White et al. | |
| 8,825,089 B2 * | 9/2014 | Godfrey | G01S 19/34 342/357.31 |
| 9,140,776 B2 * | 9/2015 | Higgison | G01S 5/0027 |

(Continued)

*Primary Examiner* — Chuong P Nguyen
(74) *Attorney, Agent, or Firm* — Griffiths & Seaton PLLC (57) ABSTRACT

Embodiments for accurately tracking objects in three-dimensional space by at least one processor device. Inter-device communications are sent between a plurality of stationary radio frequency elements to triangulate a three-dimensional position between the plurality of stationary radio frequency elements and a tracking element registerable to a user, the tracking element also in radio frequency communication with the plurality of stationary radio frequency elements. The tracking element moves, and is tracked by, the plurality of stationary radio frequency elements through the three-dimensional space.

21 Claims, 4 Drawing Sheets

(56) References Cited

U.S. PATENT DOCUMENTS

| | | | |
|---|---|---|---|
| 9,207,327 B2* | 12/2015 | Lewis-Evans | B60R 25/1025 |
| 9,485,623 B2* | 11/2016 | Smith | H04W 4/025 |
| 2005/0143909 A1* | 6/2005 | Orwant | G01S 5/0294 |
| | | | 701/408 |
| 2007/0247366 A1* | 10/2007 | Smith | G01S 5/021 |
| | | | 342/464 |
| 2009/0315776 A1* | 12/2009 | Khosravy | G01S 19/49 |
| | | | 342/452 |
| 2012/0302287 A1* | 11/2012 | Wright | G08G 1/0965 |
| | | | 455/556.1 |
| 2013/0310081 A1 | 11/2013 | Chu | |
| 2015/0156611 A1 | 6/2015 | Aggarwal et al. | |
| 2017/0059687 A1* | 3/2017 | Dinesh | G01S 5/0252 |
| 2017/0086052 A1* | 3/2017 | Hunukumbure | H04W 4/90 |
| 2017/0164323 A1* | 6/2017 | Markhovsky | H04W 64/006 |

* cited by examiner

ACCURATE TRACKING INFORMATION SYSTEM

BACKGROUND OF THE INVENTION

Field of the Invention

The present invention relates in general computing systems, and more particularly to, various embodiments for change management in computing environments.

Description of the Related Art

So-called geolocation refers to the tracking of an object. In recent years, global position systems (GPS)-based geolocation systems have become ubiquitous, with use being found in a variety of user-accessible devices from smartphones to vehicles.

SUMMARY OF THE INVENTION

Various embodiments for accurately tracking objects in three-dimensional space by a processor are provided. In one embodiment, by way of example only, a method for accurately tracking objects in three-dimensional space by at least one processor device is provided. Inter-device communications are sent between a plurality of stationary radio frequency elements to triangulate a three-dimensional position between the plurality of stationary radio frequency elements and a tracking element registerable to a user, the tracking element also in radio frequency communication with the plurality of stationary radio frequency elements. The tracking element moves, and is tracked by, the plurality of stationary radio frequency elements through the three-dimensional space.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

When the average user utilizes technologies such as geolocation, the user is taking advantage of basic principles, specifically that whatever object the user is attempting to geolocate is within a finite and static location. In short, whatever object the user is locating must be at the same geographical location at all times in order for the user to be able to route themselves to the object.

Another option for locating devices is the use of triangulating signals. However, the use of triangulation requires implementation of a three-point signal detector and computation of complex mathematical equations. The prospect of geolocation (using triangulation, GPS, or other means) is complicated if the object to be tracked (and/or the user) is in motion. While traditional geolocation, triangulation, GPS and other available methods is generally effective for stationary objects (such as movie theaters, restaurants, and the like), if a user is on a moving object (such as a cruise ship), it may be challenging for the user to locate a restroom or even another family member.

GPS devices, for example, require the line-of-sight visibility of at least four GPS satellites for operation. In some cases, such line-of-sight visibility is limited or unavailable, such as in enclosed physical structures or in other scenarios known to one of ordinary skill in the art. Ultimately traditional geolocation mechanisms serve a specific niche; these mechanisms work well within this niche but pose challenges for users in environments outside of that niche.

To address the challenges seen above, the mechanisms of the illustrated embodiments present various embodiments for establishing accurate physical location in situations where traditional geolocation functionality (such as GPS) may be insufficient and/or not available. The mechanisms of the illustrated embodiments, as will be described, may be utilized in multiple ways, in a variety of scenarios such as the previously mentioned cruise ship, multi-story building, or even the location of individuals in an enclosed structure in the event of a disaster.

The mechanisms of the illustrated embodiments utilize triangulation between various components; however the novel functionality and utility of the mechanisms of the illustrated embodiments lies in the use of inter-device communication (e.g., radio frequency communication between stationary devices) to permit greater accuracy than traditional triangulation mechanisms as will be further described.

The mechanisms of the illustrated embodiments also incorporate use of virtualized three-dimensional maps of a particular environment that are stored in memory. Use of inter-device communication coupled with this virtualized mapping functionality allows client devices an ability to accurately gauge location information, and optionally, know the location of other devices in the particular environment.

Taking the novel functionality described above further, the mechanisms of the illustrated embodiments allows each of the stationary tracking elements (also referred to herein as "beacons") in a particular environment to ascertain precisely where in the three-dimensional environment additional stationary beacons are located within the environment by serving as a fixed point in the embedded three-dimensional map and communicating between beacons by, for example, adding new client devices using triangulation of add points. This functionality, for example, provides the devices (stationary and movable/tracking) with a form of real-time enhanced geolocation functionality using radio frequencies (e.g., Bluetooth) within any structure across the X, Y, and Z planes.

As will be further described, various aspects of the illustrated embodiments serve to augment the utility of the geolocation functionality. In one embodiment, several configuration steps may be undertaken previous to deployment to enhance accuracy, among other benefits. As a first step, an engineering-level three-dimensional (3D) map of the particular structure/environment to receive the functionality may be obtained. Next, a site survey may be conducted to determine optimal beacon locations (e.g., largest signal strength, etc.). In a following step, the various beacons may be installed. In one embodiment, this installation may be performed using a variety of networking topologies such as traditional Internet Protocol (IP)-type networking, or mesh networking technologies for simplified deployments.

In a further exemplary step, the 3D virtualized map may then be provided with the various beacon installation locations included in a particular beacon deployment. In one embodiment, each beacon may automatically determine the applicable signal strength of all visible neighbors.

Once the stationary radio frequency devices have been installed, various calibration steps may be employed. In one embodiment, a walk of the structure may be conducted to ensure sufficient signal strength within the environment. The various beacons may be configured to collect the enhanced signal information from this calibration step to further enhance the known signal levels at locations within the structure.

Once the beacons are deployed, configured with the mapping functionality and properly calibrated, an applicable client device (herein also referred to as tracking element) may connect to one or more beacons. The beacon(s) then may provide the virtualized 3D structure map to the tracking element, which includes the stationary element locations, and the computed signal strength values of key locations within the structure from the deployment calibration.

In one embodiment, client devices configure which other devices are able to see the client device's location on the applicable 3D map. This configurable access may be tiered such that multiple levels of access may be implemented. Examples may include "emergency personnel," "security," "friend," "family," "parents," and "everyone."

In a further embodiment, an Application Programming Interface (API) may be used in conjunction with the tracking element, stationary elements, or otherwise. The API may allow ease of access by the user, or others seeking access as one of ordinary skill in the art will appreciate. In addition, the API may allow for ease of configuration of the tracking element, diagnostics and calibration of the various stationary elements, or in still further embodiments, integration with other applications such as social media applications, allowing the functionality provided by the mechanisms of the illustrated embodiments a greater degree of coverage and usage (for example, access outside the covered environment for a specific scenario).

Various aspects of the mechanisms of the illustrated embodiments may allow for the input and consideration of various feedback. The feedback may be provided by the user, others with certain access to the system, IT personnel, or others with ties to the system in one form or another (developers, test personnel, etc.). For example, a user may ascertain that a certain location determined by the system to be incorrect. By way of the API, for example, the user may inform one or more of the various system components/system software of the issue. In one embodiment, this information may be broadcast on an inter-device basis to other stationary components. In this way, the various individual components and/or system as a whole has an opportunity to consider the feedback information and compare the feedback information with the information currently populated in the applicable 3D map.

When informed of a desired location adjustment as previously described, for example, (or any other feedback), the various components may use real-time analytics to consider whether the adjustment is warranted. The real-time analytics may incorporate data such as a tracking element's relative position to the applicable device requesting the change to determine veracity and/or usefulness, and if the requesting device was at fault or whether if indeed an aspect of the current 3D map needs adjustment.

Figure 1:
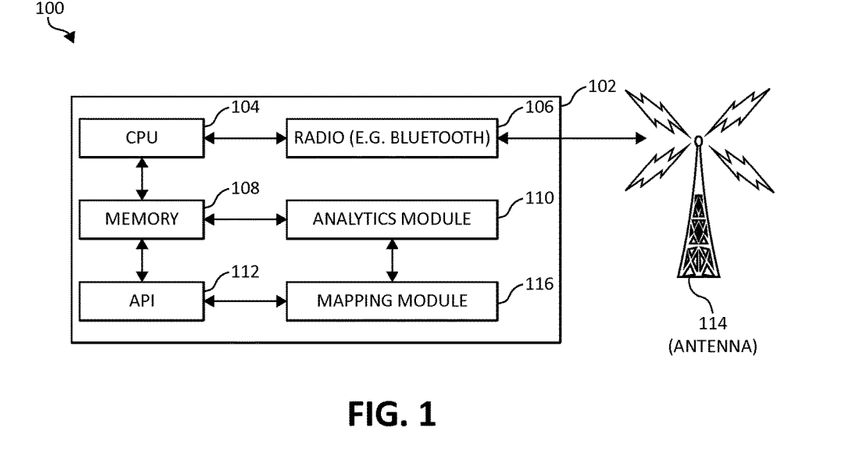
FIG. 1 is a block diagram of a representation of an exemplary stationary radio frequency element, in which various aspects of the present invention may be realized.
Figure 2:
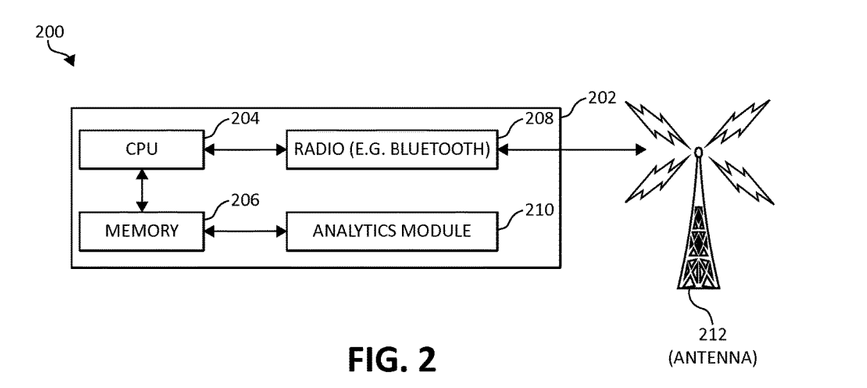
FIG. 2 is a block diagram of a representation of an exemplary tracking element, here again in which aspects of the present invention may be realized.

Turning to the Figures, FIGS. 1 and 2 are block diagrams that illustrate various components of exemplary stationary and tracking (beacon and client device) elements, respectively, in which aspects of the present invention may be implemented. Turning first to FIG. 1, a representation 100 of an exemplary stationary radio frequency element 102, or beacon 102, is depicted. Stationary element 100 includes a variety of exemplary components that provide specific functionality according to aspects of the present invention.

Stationary element 102 as shown includes a central processing unit (CPU) 104, a radio 106, such as a Bluetooth® radio or other radio frequency communications protocol that will be appreciated by one of ordinary skill in the art. The radio component 106 is in communication with a bi-directional antenna 114 to provide radio communication to/from additional stationary elements 102, tracking elements, or other components within or outside of a particular environment.

Stationary element 102 also includes a memory component 108, an analytics module 110, an API 112, and a mapping module 116 as shown. Each of the various components 104, 106, 108, 110, 112, and 116, may be in communication with each other, and perform, individually or collectively, various aspects of the present invention, again as one of ordinary skill in the art will appreciate.

CPU 104 may, as one of ordinary skill in the art expect, perform various computational functionality, such as triangulation computations, or virtualizing functionality. In addition, memory 108 may store data locally, such as data representative of the virtualized 3D map, or location information of other stationary elements 102, for example.

Analytics module 110 may perform various analytics functionality according to the present invention. For example, the analytics module 110 may perform various comparative functions against transmitted and received signals from the stationary element 102 and additional stationary elements 102 (e.g., compare signal strengths of various stationary elements at various predefined locations on the virtualized 3D map). In communication with analytics module 110, mapping module 116 provides various mapping-related functionality according to present invention, such as collecting, processing, and virtualizing information representative of a particular environment in which the tracking will occur.

Mapping module 116 may work in conjunction with analytics module 110, in such areas as the aforementioned feedback received from a user, operator or other individual concerning the system's accuracy. The mapping module may provide 3D mapping information to the analytics module, which in turn may use comparative information from the stationary element 102 or other stationary elements 102 to verify whether a change need be made. If such a change is necessary, the analytics module 110 may communicate such change(s) to the mapping module 116 that are then updated into the applicable virtualized 3D map of the environment.

Turning next to FIG. 2, following, a block diagram 200 of an exemplary tracking element 202 or client device 202 is depicted. In one embodiment, the tracking element 202 or client device 202 is operated by a user in the environment. As such, the tracking element 202 may move throughout the environment, and provide updated real-time information to the user monitoring the element 202. In similar fashion to the stationary elements 102, tracking elements 202 include various components to provide functionality according to aspects of the present invention. A CPU 204 may engage in computational operations, and memory 206 may store information. A radio 208 (here again, e.g., Bluetooth® radio or other radio frequency communications protocol) is in communication with the CPU 204 and an antenna 212 as shown. Antenna 212 may also be configured bi-directionally to allow for communication from/to the tracking element 202 and between stationary element(s) 102.

Tracking element 202 may include, among other components, an analytics module 210. Analytics module 210, may, in one embodiment, function in a similar manner to the analytics module 110 in stationary elements 102, by performing comparative functionality of various information pertaining to a particular environment in which the tracking element 202 is moved.

Figure 3:
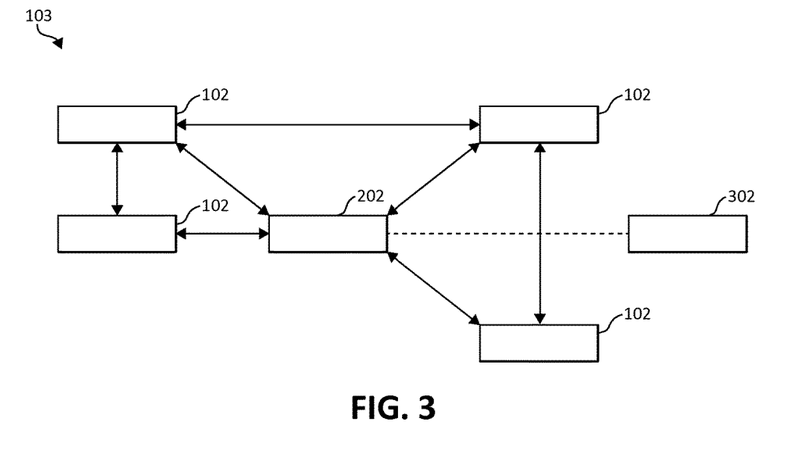
FIG. 3 is a block diagram of an exemplary embodiment incorporating a number of stationary radio frequency elements in communication with a tracking element, again in which various aspects of the present invention may be implemented.

A representation of the stationary elements deployed in an exemplary environment 103 having a tracking element 202 is shown in FIG. 3, following. Here, a number of stationary elements 102 are disbursed throughout the environment 103 as shown. Each of the stationary elements is configured with a radio frequency communications protocol and is in bi-directional communication with the tracking element 202. In other embodiments, one or more of the stationary elements 102 communicate with the tracking element 202 in a single-direction mode.

One aspect of the representation shown in environment 103 features the bi-directional communications (using Bluetooth® or other communications protocols) of stationary elements 102 with each other. In other words, and as previously described, each of the stationary elements 102 are in contact with at least one other visible stationary element 102, and in which information such as wireless signal strength is shared between the stationary elements 102. Inter-device communication between the stationary elements 102 allows for precise triangulation between the stationary components 102 and the tracking device 202, among other benefits.

In addition to the stationary elements 102 and the tracking element 202, there is an additional tracking element 302, client device 302, and/or appliance 302 shown. Client device 302 may be operated by an additional user that has been granted a specific degree of access, as previously described, to the tracking element 202 (and thereby, to the extent the access provides, to information regarding the tracking element 202 in the environment 103). The level of access given to the tracking element 302 may vary according to a specific implementation. For example, the tracking device 302 may belong to a family member of tracking device 202. In that sense, the tracking device 302 has access "family" to tracking device 202.

Figure 4:
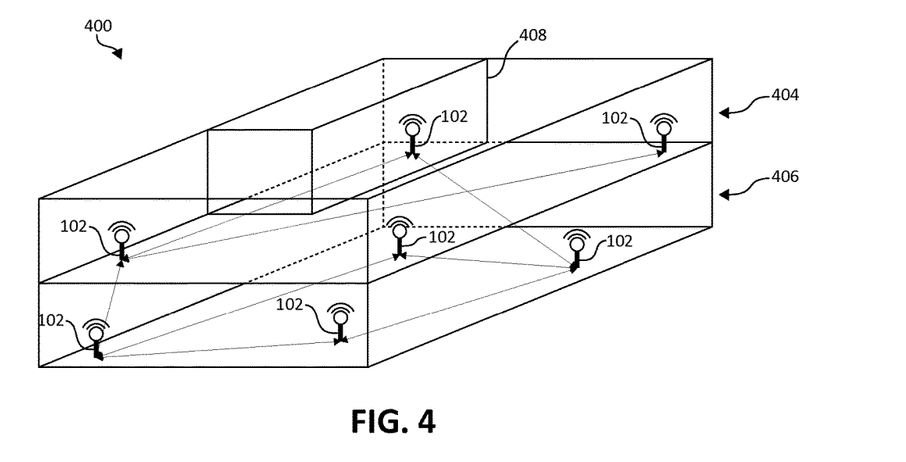
FIG. 4 is a block diagram of an illustration of a number of stationary radio frequency elements in a representative three-dimensional space.

FIG. 4, following, provides a further illustration of the communicative aspects of the present invention as represented by an exemplary deployment 400 of a number of stationary elements in various portions of three-dimensional space. Additionally, elements of the deployment 400 may be incorporated into an exemplary virtualized 3D mapping of the representative environment.

As shown, each of the stationary elements 102 have been deployed in various portions of the environment, including some elements in areas of levels 404 and 406, respectively. Here, as in FIG. 3, previously, it may be seen that the stationary elements 102 are each in communication with each other, sharing various information about the environment such as signal strength data and other information such that an accurate location of example area 408 may be determined. Area 408 may be a restroom, or other feature of the environment. Accordingly, the metes and bounds of the area 408 may be represented accurately in the virtualized 3D representation of the environment. Subsequently, the 3D mapping information may then be provided to a tracking element/client device.

Figure 5:
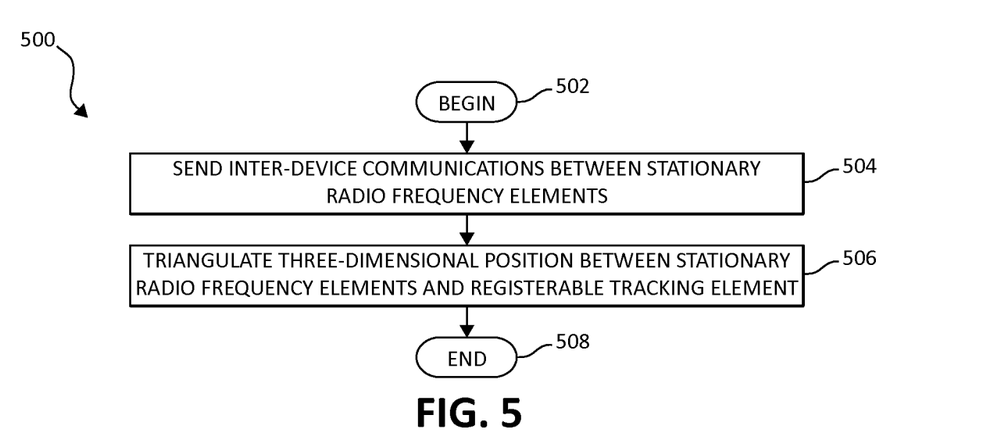
FIG. 5 is a flow chart diagram of an exemplary method for tracking an object in three-dimensional space, in which various aspects of the present invention may be implemented.

Turning next to FIG. 5, following, an exemplary method 500 for accurately tracking objects in three-dimensional space by at least one processor device is depicted, in which various aspects of the present invention may be implemented. Method 500 begins (step 502) with the sending of inter-device communications between stationary radio frequency elements in a particular environment (step 504). As previously mentioned, this inter-device communication may include various data known to a particular stationary element, such as signal strength of the particular stationary element or signal strengths of other stationary elements visible to the particular stationary element.

In a following step, the method 500 triangulates a three dimensional position between the stationary radio frequency elements and a registerable (to a user and/or client) tracking element (step 506). The accuracy of triangulation operations is enhanced by the inter-device communication between stationary elements as previously described. The method 500 then ends (step 508).

Figure 6:
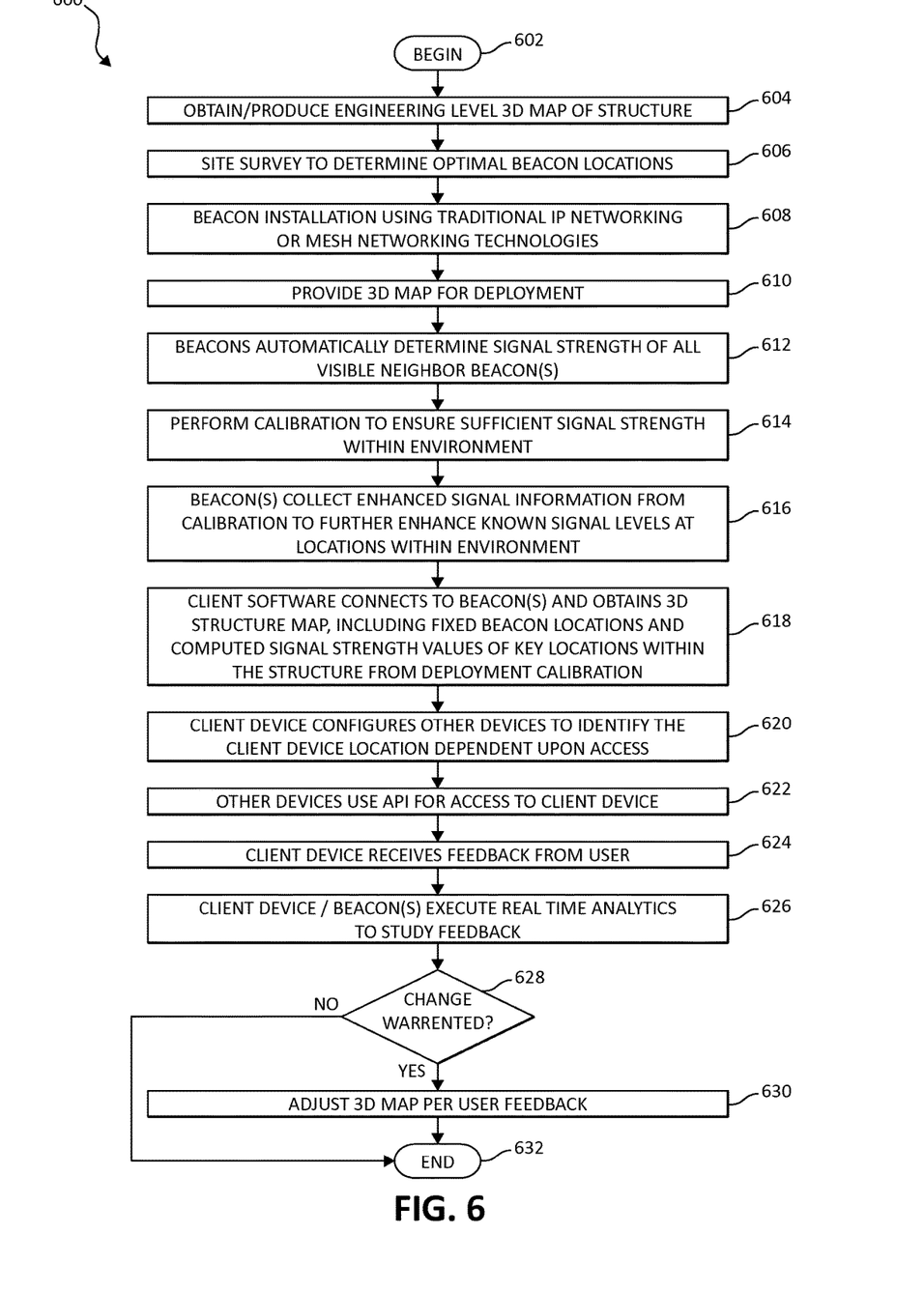
FIG. 6 is a flow chart diagram of an additional method for tracking an object in three-dimensional space, here again in which various aspects of the present invention may be implemented.

Turning to FIG. 6, following, a flow chart of an additional exemplary method 600 for accurately tracking objects in three-dimensional space by at least one processor device is depicted. Method 600 begins (step 602) with the step of obtaining/producing an engineering level 3D map of a particular structure as a preliminary step (step 604). In addition, a site survey is performed to determine optimal beacon locations (step 606) (e.g., in terms of signal strength or other operational characteristics). The beacons are installed using traditional IP networking or mesh networking technologies (step 608). The engineering level 3D map is then provided for deployment (step 610).

Once the beacons are deployed in their respective positions, and configured with the 3D mapping information, the beacons automatically determine the applicable signal strength of all visible neighbor beacon(s) in step 612. The system, users, IT personnel, or others, may perform calibration operations to ensure sufficient signal strength is found within the environment to a client device (step 614).

In following step 616, the beacon(s) collect enhanced signal information from the calibration step to further enhance known signal levels at particular locations within the environment (step 616). As a next step, the client device software connects to the beacon(s) and obtains the virtualized 3D mapping information, including fixed beacon locations and computed signal strength values of key locations within the structure from the deployment calibration (step 618).

In a configuration step, the particular client device then configures other client devices to identify the particular client device location as dependent upon an assigned level of access (step 620). In the depicted embodiment, once access levels are defined, other client devices (or other connected devices) may use an API for access to the particular client device (step 622).

While the user interacts with the 3D environment, the user may notice an error in location, which the user provides to the particular client device, and receives the feedback data (step 624). The client device, beacon(s), or other connected devices then execute real-time analytics to study the veracity and authenticity of the received feedback (step 626). If a change is warranted (decision step 628), the virtualized 3D mapping is adjusted per the user feedback (step 630). Returning to step 628, if a change is determined not to have been warranted, the method 600 then ends (step 632).

In view of the various exemplary embodiments shown in FIGS. 5 and 6, respectively, consider the following use case examples for various embodiments of the present invention. In a first case, various aspects of the illustrated embodiments may be employed at an automobile manufacturing facility. In this environment, various invention aspects may be used to locate personnel and equipment, as well as to identify vehicles moving throughout the manufacturing process. Beacons may be deployed at major manufacturing step locations, along walks ways, and near entry and exit points of the building.

In view of such a deployment, knowledge of the relative position of personnel to large manufacturing equipment would assist in evacuations during any major equipment failure as well as set off necessary alarms in the event of an unintended merger of locations. Time/attendance keeping software may also integrate with the locations to determine overtime, mandated break violations, and tardiness.

In a second case, various invention aspects may be employed in a family location on a children's oriented cruise ship. Parent, and Family relationships may be marked and identified when registering with the system. Using deployed beacons on the cruise ship, clients could readily track and identify the location of their children on the cruise. In the event of a client device being detected in an abnormal location such as employee only area, or "overboard" the ship, emergency personal would be alerted automatically.

In addition, locations of specific events on the cruise ship may also be tracked and pathing could be coordinated by way of the beacons on the ship, such as restrooms, and eating establishments. Family level alerts could be triggered if children are in non-registered non-public locations on the ship (i.e., someone else's stateroom).

Additional examples may include (3), search and rescue assistance in the event of a disaster, (4), multi-storied building navigation, (5), dynamic building evacuation plans, and (6), optimal vendor and restroom facilities destination based upon current location and queue depth. In each of these use cases, and as one of ordinary skill in the art will appreciate, the implementation of various inventive aspects may vary according to a particular situation, particular need, particular environment in which location information is desired, and the like.

In addition to the foregoing, and in other embodiments, the mechanisms of the illustrated embodiments may be further enhanced as follows. First, inter-beacon connectivity according to various embodiments may further enable the transmission and coordination of relative signal strength structural signal interference levels. Second, calculations based on the inter-beacon strength and the known calibration locations may permit extremely accurate representations of expected signal strength at all points within the particular environment. In addition, accurate digital 3D maps of the particular environment, including the known beacon location points enhances the client device's ability to calculate a particular location, and determine the accuracy of the location. For example, it is not likely that a particular client device is located between floors if is not located in either a stairwell or an elevator. These generalized observations may be considered by the system as environmental analytics in the calculation of a particular location.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for accurately tracking objects in three-dimensional space by at least one processor device, comprising:
   sending inter-device communications between a plurality of stationary radio frequency elements to triangulate a three-dimensional position of a tracking element registerable to a user between the plurality of stationary radio frequency elements when using a global positioning system (GPS) by the plurality of stationary radio frequency elements is unavailable, the tracking element also in radio frequency communication with the plurality of stationary radio frequency elements through a same network protocol using the inter-device communications, wherein the tracking element moves, and is tracked by, the plurality of stationary radio frequency elements through the three-dimensional space.

2. The method of claim 1, further including, sending, by at least one of the plurality of stationary radio frequency elements, information to the tracking element to establish a three-dimensional map of the three-dimensional space on the tracking element.

3. The method of claim 1, further including performing a calibration function between at least one of the plurality of stationary radio frequency elements and the tracking element in the three-dimensional space.

4. The method of claim 1, further including communicating, by the tracking element, with an additional tracking element according to a predetermined level of access.

5. The method of claim 1, further including providing an access to the tracking element through an Application Programming Interface (API), wherein the API is accessible by an external user according to a predetermined level of access.

6. The method of claim 1, further including receiving, by the user, feedback information in the tracking element to adjust for a previous location determination by the tracking element in the three-dimensional space.

7. The method of claim 6, further including, subsequent to receiving the feedback information, applying at least one real-time analytic against the feedback information to determine a usefulness of the feedback information.

8. A system for accurately tracking objects in three-dimensional space, comprising:
   at least one processor;
   a plurality of stationary radio frequency elements incorporating the at least one processor; and
   a tracking element, registerable to a user, in radio frequency communication with the plurality of stationary radio frequency elements through a same network protocol as used by the plurality of stationary radio frequency elements; wherein:
   the plurality of stationary radio frequency elements send inter-device communications therebetween to triangulate a three-dimensional position of the tracking element between the plurality of stationary radio frequency elements when using a global positioning system (GPS) by the plurality of stationary radio frequency elements is unavailable, while the tracking element moves, and is tracked by, the plurality of stationary radio frequency elements through the three-dimensional space.

9. The system of claim 8, wherein the at least one of the plurality of stationary radio frequency elements sends information to the tracking element to establish a three-dimensional map of the three-dimensional space on the tracking element.

10. The system of claim 8, wherein the tracking element performs a calibration function between the tracking element and at least one of the plurality of stationary radio frequency elements in the three-dimensional space.

11. The system of claim 8, wherein the tracking element communicates with an additional tracking element according to a predetermined level of access.

12. The system of claim 8, further including an Application Programming Interface (API) for providing an access to the tracking element therewith, wherein the API is accessible by an external user according to a predetermined level of access.

13. The system of claim 8, wherein the tracking element receives, by the user, feedback information to adjust for a previous location determination by the tracking element in the three-dimensional space.

14. The system of claim 13, wherein the at least one processor, subsequent to receiving the feedback information, applies at least one real-time analytic against the feedback information to determine a usefulness of the feedback information.

15. A computer program product for accurately tracking objects in three-dimensional space by at least one processor device, the computer program product comprising a non-transitory computer-readable storage medium having computer-readable program code portions stored therein, the computer-readable program code portions comprising:

a first executable portion that sends inter-device communications between a plurality of stationary radio frequency elements to triangulate a three-dimensional position of a tracking element registerable to a user between the plurality of stationary radio frequency elements when using a global positioning system (GPS) by the plurality of stationary radio frequency elements is unavailable, the tracking element also in radio frequency communication with the plurality of stationary radio frequency elements through a same network protocol using the inter-device communications, wherein the tracking element moves, and is tracked by, the plurality of stationary radio frequency elements through the three-dimensional space.

16. The computer program product of claim 15, further including a second executable portion that sends, by at least one of the plurality of stationary radio frequency elements, information to the tracking element to establish a three-dimensional map of the three-dimensional space on the tracking element.

17. The computer program product of claim 15, further including a second executable portion that performs a calibration function between at least one of the plurality of stationary radio frequency elements and the tracking element in the three-dimensional space.

18. The computer program product of claim 15, further including a second executable portion that communicates, by the tracking element, with an additional tracking element according to a predetermined level of access.

19. The computer program product of claim 15, further including a second executable portion that provides an access to the tracking element through an Application Programming Interface (API), wherein the API is accessible by an external user according to a predetermined level of access.

20. The computer program product of claim 15, further including a second executable portion that receives, by the user, feedback information in the tracking element to adjust for a previous location determination by the tracking element in the three-dimensional space.

21. The computer program product of claim 20, further including a third executable portion that, subsequent to receiving the feedback information, applies at least one real-time analytic against the feedback information to determine a usefulness of the feedback information.

* * * * *